United States Patent
Spivey

(10) Patent No.: US 7,232,217 B2
(45) Date of Patent: Jun. 19, 2007

(54) PRESCRIPTION LENSES AND METHOD OF MAKING

(76) Inventor: Brett Spivey, 7435 Neptune Dr., Carlsbad, CA (US) 92009

( * ) Notice: Subject to any disclaimer, the term of this patent is extended or adjusted under 35 U.S.C. 154(b) by 42 days.

(21) Appl. No.: 11/243,944

(22) Filed: Oct. 5, 2005

(65) Prior Publication Data

US 2006/0209254 A1  Sep. 21, 2006

Related U.S. Application Data

(63) Continuation-in-part of application No. 11/085,436, filed on Mar. 21, 2005.

(60) Provisional application No. 60/688,092, filed on Jun. 6, 2005.

(51) Int. Cl.
*G02C 7/08* (2006.01)
*G02C 7/02* (2006.01)

(52) U.S. Cl. .................................. 351/159; 351/172
(58) Field of Classification Search ................ 351/159, 351/168–172

See application file for complete search history.

(56) References Cited

U.S. PATENT DOCUMENTS

| | | | | |
|---|---|---|---|---|
| 1,948,636 A | * | 2/1934 | Tillyer | 351/177 |
| 3,507,565 A | * | 4/1970 | Alvarez et al. | 351/222 |
| 3,617,116 A | * | 11/1971 | Jones | 351/177 |

* cited by examiner

*Primary Examiner*—Scott J. Sugarman
(74) *Attorney, Agent, or Firm*—John R. Ross

(57) ABSTRACT

A lens unit with at least two lens elements. The first of the two lens elements has two surfaces providing a special varying lens thickness as a function of position across the lens surfaces, and the second of the two lens elements has two surfaces providing a varying lens thickness that is substantially complementary to the varying thickness of the first lens element. The designs of the surfaces are chosen such that small adjustments of the relative positions of the two lenses in a first direction predominantly perpendicular to the viewing direction results in changes in the combined focus of the two lenses of each lens unit. Astigmatism is corrected by a small adjustment in a second direction perpendicular to the first direction followed by a rotation of the two lenses about the axis of the two lenses. When the adjustments have been made the two lenses are fixed with respect to each other and installed in eyeglass frames. Cutting to the shape of the eyeglass frames can occur either before or after the fixing.

7 Claims, 3 Drawing Sheets

PRESCRIPTION LENSES AND METHOD OF MAKING

This application is a continuation in part of U.S. patent application Ser. No. 11/085,436 filed Mar. 21, 2005, which is incorporated by reference herein and claims the benefit of Provisional Patent Application Ser. No. 60/688,092 filed Jun. 6, 2005. This invention relates to lenses and in particular to eyeglasses lenses and to processes for making eyeglass lenses.

BACKGROUND OF THE INVENTION

Thin Lenses

In ophthalmology and optometry it is customary to specify the focal length of spectacle lenses in diopters. The power P of any lens in diopters D is defined as the reciprocal of the focal length f in meters (i.e., $P=1/f$). For thin lenses, the power P of a two lens ($P_1$ and $P_2$) stacked combination is the sum of the power of the two lenses (i.e., $P=P_1+P_2$). Stacking of two thin lenses 1 and 2 where $P_1=-P_2$ would produce a power of zero, equivalent to a flat plate. The two lenses do not perfectly cancel, but as long as the power is fairly weak (i.e., less than about 5 diopters), the human eye does not detect the residual aberration.

Numbers of Lenses Needed to Correct Focus and Astigmatism

No two eyes are exactly alike and if we live long enough we will all need vision correction. So a very large percentage of the people on earth will need glasses. Glasses can be specially made to fit each person's prescription, but this would be expensive and time consuming. In most cases eye care facilities stock a variety of lenses with ranges of focal and astigmatism correction. Then for each patient lenses are chosen from this stock of lenses that most closely matches the patient's needs. The bigger variety in the stock of lenses the closer the needs can be matched in general but also the larger the stock the more expensive it is to maintain the stock.

Nearsightedness and Farsightedness

Nearsightedness is a condition of the eye in which distance objects can not be focused on the retina and farsightedness is a condition of the eye in which near objects can not be focused on the retina. These conditions are normally corrected by spectacle lenses having a power needed to correct the eye's focus error.

Astigmatism

Astigmatism is a condition of the eye caused by an irregular curvature of a eye surface, usually the front surface. It can be corrected by a spectacle lens in which at least one surface has a different curvature in different planes through the lens axis.

What is needed is a better technique for matching patient's needs for focus and astigmatism correction without having to maintain a very large stock of lenses.

SUMMARY OF THE INVENTION

The present invention provides a lens unit with at least two lens elements. The first of the two lens elements has two surfaces providing a special varying lens thickness as a function of position across the lens surfaces, and the second of the two lens elements has two surfaces providing a varying lens thickness that is substantially complementary to the varying thickness of the first lens element. The designs of the surfaces are chosen such that small adjustments of the relative positions of the two lenses in a first direction predominantly perpendicular to the viewing direction results in changes in the combined focus of the two lenses of each lens unit. Astigmatism is corrected by a small adjustment in a second direction perpendicular to the first direction followed by a rotation of the two lenses about the axis of the two lenses. When the adjustments have been made the two lenses are fixed with respect to each other and installed in eyeglass frames. Cutting to the shape of the eyeglass frames can occur either before or after the fixing.

BRIEF DESCRIPTION OF THE DRAWINGS

FIGS. 1A-6A show optical conditions that were computer simulated with CAD optical software.

FIGS. 1B-6B show the results of the FIGS. 1A-6A simulations.

DETAILED DESCRIPTION OF PREFERRED EMBODIMENTS

The Parent Application

Figure 2A:
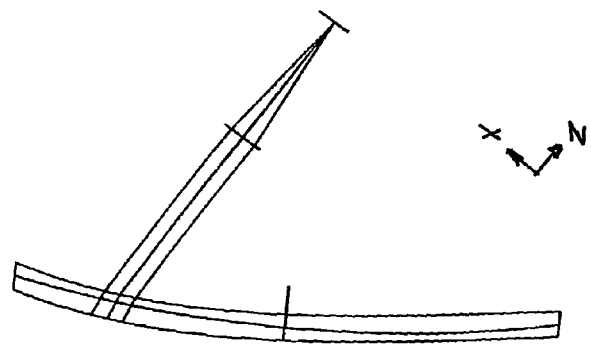

The present invention is a continuation in part of the invention described in the parent patent application, U.S. patent application Ser. No. 11/085,436 which has been incorporated by reference herein. That application describes and claims a lens unit with at least two lens elements. A mechanism is provided to adjust the position of one of the two lens elements relative to the other in a direction generally perpendicular to a viewing direction. The first of the two lenses has a specially designed surface and the second of the two lenses has a surface that is substantially complementary to the surface of the first lens. In preferred embodiments the lens units are mounted in a frame to provide eyeglasses with adjustable focus. The designs of the specially designed surfaces are chosen such that small adjustments of the relative positions of the two lenses in directions predominantly perpendicular to the viewing direction results in changes in the combined focus of the two lenses of each lens unit. In a preferred embodiment the specially designed surface of the first lens of each lens unit is described by:

$$Z(X,Y)=C_1*(X^3/3+XY^2)+C_2,$$

where $C_1$ and $C_2$ are constants. The specially designed surface of the second lens of each lens unit is described by:

$$Z_C(X,Y)=C_1*(X^3/3+XY^2)+C_2.$$

When the two lenses are stacked, as long as the thickness variations are small the effective thickness of both lenses is equal to:

$$Z(X,Y)+Z_C(X,Y)=2*C_2,$$

which is the expression for a flat plate. If the location of $Z_C$ in the x direction is changed by a small amount, dx, then the thickness variations do not cancel anymore, and the net thickness is:

$$Z(X,Y)+Z_C(X+dx,Y)=2*C_2+-C_1*(dx*(X^2+Y^2)+dx^2*X+dx^3/3).$$

This is the expression for a powered optic, either a focusing or diverging lens, depending on the sign of $C_1$.

Various techniques for providing the lateral adjustment are disclosed. A simple technique is a thumbscrew adjustment that is operated by the wearer. Another is finger force against a friction force between one of the lenses and the frame of the glasses. A small two-position or three-position lever adjustment can also be operated manually. Automatic focusing techniques are also disclosed.

The Present Invention

Since the filing of the parent application, Applicant has realized that the techniques described in that application can be applied to greatly reduce the cost of providing eyeglasses. These techniques reduce needed inventory stocks of lenses to meet patient's needs for focus and astigmatism correction. These techniques are described below:

1) Sets of complementary lenses are prepared as described in the parent application, except the complementary lenses are set during a second stage of a manufacturing process and not adjusted. The objective of this is to be able to manufacture many different lens prescriptions with a small number of parts. The parts will be able to cover a range of focus settings. Preferably there will be a relatively small number of certain, coarsely spaced, focus powers on lens pairs that are maintained in stock. Applicant believes that most eye-care facilities will choose to stock about 10 to 20 different focus power lens pairs. Fine-tuning will be accomplished by displacing the two lenses in the lens pair. The lens pair is then cut and placed into the frames. This process provides for the correction of focus but not astigmatism.

2) To also provide for the correction of focus and astigmatism a lens pair closest to the desired focus power is chosen from stock as described in 1) above. Adjustments are made in a first direction (the X-direction) to provide the desired focus. Then adjustments are made in a Y-direction perpendicular to the X-direction to apply astigmatism correction to the lenses. Here are the mathematics:
   a. Let the lens thickness of the first lens be $f\_lens1(X, Y) = C*(X^3/3 + XY^2) + t_0 +$ (any polynomial of degree <3), where C and $t_0$ are constants.
   b. Let the lens thickness of the second lens be $f\_lens2(X,Y) = -C*(X^3/3 + XY^2) + t_0 +$ (the complementary polynomial).
   c. As described in more detail in the parent application and below, the lenses can also include an overall bow, or any polynomial degree less than 3, or can have a deviation which is not noticeable to the eye, or can be tapered from the center, or can include a base amount of constant correction which is not complementary (such as a base focus correction or a progressive lens correction)
   d. Move the lenses with respect to each other in X and Y. The relative motion is most important, but for these calculations we will move the lenses in opposite directions.
   e. Net thickness of both lenses is then $f\_lens1(X+dx, Y+dy) + f\_lens2(X-dx, Y-dy)$
   f. This evaluates to $[2*C*dx*(X^2+Y^2)] + [2*C*dy*(2XY)] + [(2/3)*C*dx*(dx_2 + 3dy^2)] + 2t_0 +$ (a polynomial of degree <2)
   g. The first bracketed term, proportional to dx, is the focus.
   h. The second bracketed term, proportional to dy, is astigmatism in a certain direction.
   i. The third term is just a net thickness, which the eye does not notice.
   j. A polynomial of degree <2 introduces net thickness and wedge, which does not affect visual acuity.
   k. Astigmatism comes in two directions, described by $2XY$ and $X^2-Y^2$. These are equivalent to each other except for a 45° rotation. In order to make the lens pair correct both directions of astigmatism, the pair of lenses will need to be rotated, as a unit, after the offsets have been applied, up to plus or minus 45°. The focus is unaffected by this rotation.
   l. After shifting and rotation, the lenses are cut out to fit into the frames.

3) In the examples shown in the parent application, the cubic surfaces are on the inside surfaces between the two lenses. This in general will provide better correction as compared to having the cubic surfaces on the outside surfaces, but requires a gap between the lenses. As an alternative, the cubic surfaces can be on the outside and matched spherical surfaces can be on the inside. After adjustment, the lenses are glued together (preferably with refractive index matching glue) as a single unit with no air gap. This should provide a superior mechanical structure, and the internal surfaces are removed, but the optical performance may be somewhat inferior.

Techniques for Improving Profile

The reader should note that if the polynomial surface includes certain other terms, then the basic functionality is preserved, and is substantially equivalent. The effects of the addition of these other terms have been described in the parent application that has been incorporated by reference.

Computer Simulations

Various optical designs based on the present invention have been tested with computer simulations. Specific simulations were made using computer aided design software available from Zemax Development Corporation with offices in Bellevue, Wash. Several simulations were made for lens pairs with optical powers of 0 diopter, +2 diopters, and −2 diopters at angles of 0 degrees, 30 degrees up, 30 degrees down, 30 degrees left and 30 degrees right. In all cases the simulations show results that are about the same or better than standard prior art spectacle lenses for correcting focus. Typical examples of these simulations are shown in FIGS. 1A through 6B.

Zero Diopters

Figure 1A:
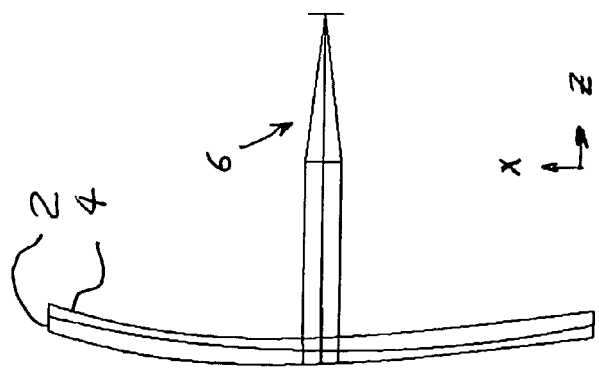
Figure 1B:
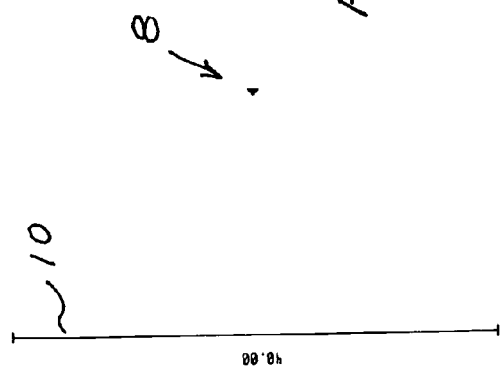

FIG. 1A is a simulations of a 0 diopter combinations of two lenses. The two lenses are shown at 2 and 4. The optics of a typical human eye is simulated at 6. The resulting spot size on the retina is shown in FIG. 1B at 8. This spot size can be compared with 40 micron reference line 10. The average rms radius of the spot is 0.323 micron. This is smaller than the diffraction limit of the human eye, which is about 0.7 microns for the average rms radius. FIG. 2A shows the result of 0 diopters looking up at 30 degrees. The resulting spot size in this case is shown at 12 in FIG. 2B. In this case the average rms radius is measured at 0.842 microns, which is just slightly larger than the 0.7 micron rms diffraction limit of the human eye.

Plus Two Diopters

Figure 3A:
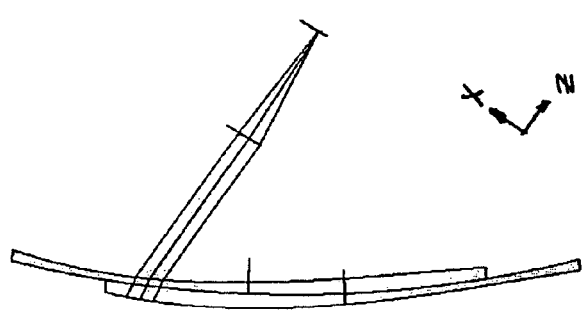
Figure 4A:
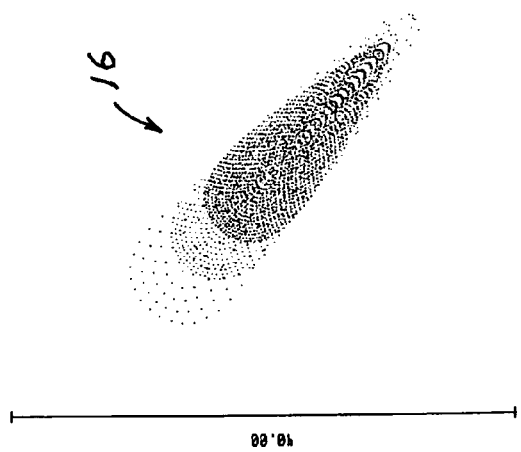
Figure 3B:
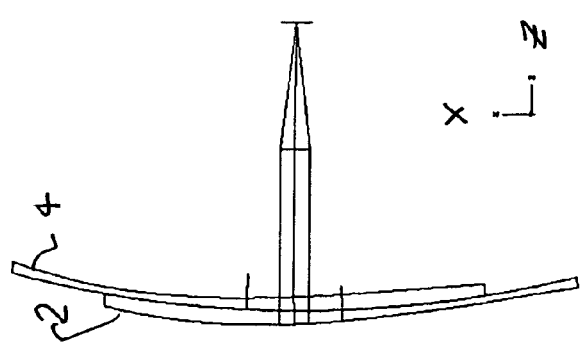
Figure 4B:
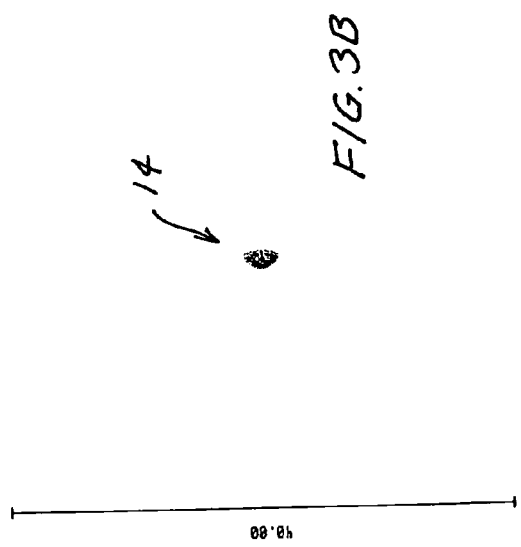

FIGS. 3A and 3B show a +2 diopter simulation looking straight ahead. Lens 2 has been positioned downward with respect to lens 4. The resulting spot size is shown at 14 in FIG. 3B and as above can be compared with 40 micron reference line 10. The average rms radius is measured at 0.558 microns, which is smaller than the 0.7 micron diffraction limit rms radius of the human eye. FIGS. 4A and 4B show the results +2 diopters looking up at 30 degrees. The resulting spot size in this case is shown at 16 in FIG. 4B. Much of the size of spot 16 is attributable to chromatic aberration. In this case the average rms radius is measured at 6.675 microns, which is about 10 times larger than the 0.7 micron rms diffraction limit of the human eye. However, the optical error associated with this enlarged spot size is about the same as experienced with typical spectacle lenses at off axis angles of about 30 degrees and the error is unlikely to be noticeable by a typical wearer.

Figure 2B:
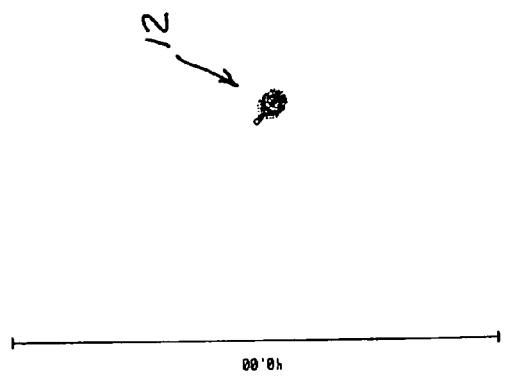

The spot size 16 in FIG. 2B may to some readers appear relatively large. However, the reader is encouraged to keep in mind the actual magnitude of these optical aberrations in prospective. For example, the 40 micron reference line 10 is approximately equal to the thickness of a typical human hair. Light detectors in the eye are tiny rods and cones. Cones (which are sensitive to color) are typically about 6 microns in diameter and a little smaller in the fovea region. Rods are about 2 microns in diameter but many of these rods are typically connected to the same nerve so their contributions are summed.

Minus Two Diopters

Figure 6A:
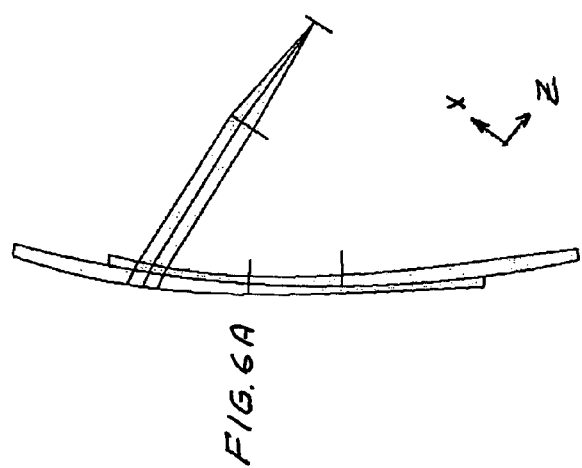
Figure 6B:
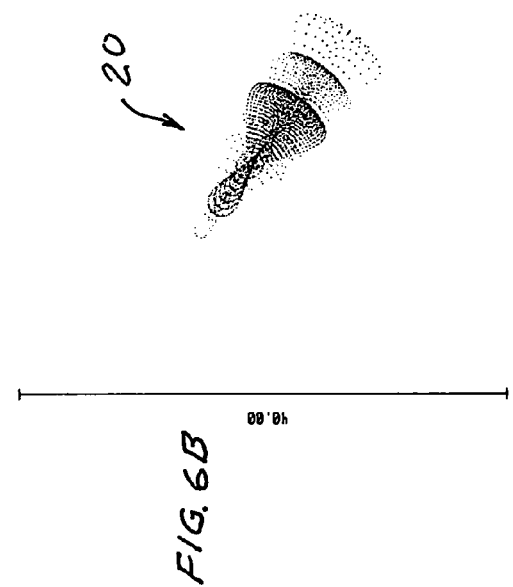
Figure 5A:
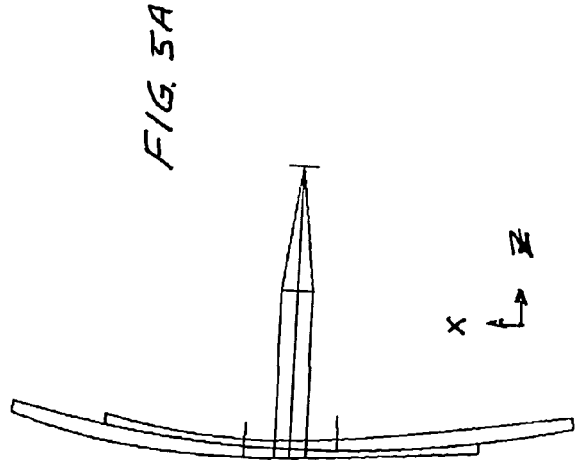
Figure 5B:
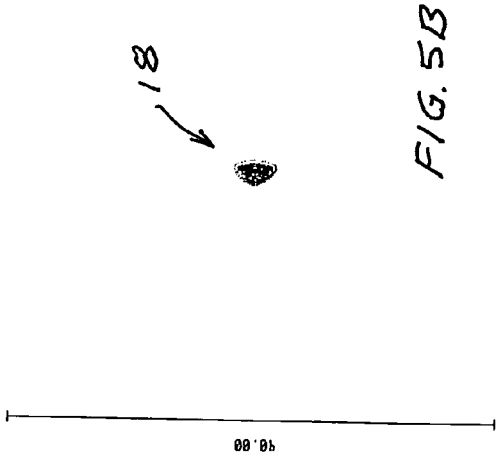

FIGS. 5A and 5B show a −2 diopters simulation looking straight ahead. Lens 2 has been positioned upward with respect to lens 4. The resulting spot size is shown at 18 in FIG. 3B. The average rms radius is measured at 0.558 microns, which is smaller than the 0.7 micron diffraction limit rms radius of the human eye. FIGS. 6A and 6B show the results −2 diopters looking up at 30 degrees. The resulting spot size in this case is shown at 20 in FIG. 6B. In this case the average rms radius is measured at 4.789 microns, which is about 7 times larger than the 0.7 micron rms diffraction limit of the human eye. However, as explained above, the optical error associated with this enlarged spot size is about the same as experienced with typical spectacle lenses at off axis angles of about 30 degrees and the error is unlikely to be noticeable by a typical wearer.

Variations

The reader should understand that the present invention is not limited to the specific embodiments described above and that many modifications and additions or deletions could be made to those described embodiments. For example lenses can be made as described above, except that the equation describing the lens thickness only applies in a center "sweet spot" region. Outside of this region the lens shape is optimized with thickness or other concerns in mind. The lens surfaces can all have a common curvature term, and the lenses can be displaced along a curved surface as opposed to pure lateral displacement. These surfaces can have the same third degree polynomial thickness variation, but on a curved basis. There can be a net thickness on the lens unit in the null position to provide an optical base figure. This optical base figure could be applied to any or all of the lens elements in the lens unit. As an example, the complementary cubic polynomial surfaces may be designed to provide up to plus or minus two diopters of focus correction. In this case, eye care professionals could select from different sets of lens units with an offset focus base figure spaced every four diopters. As another example, a progressive surface could be incorporated into the optical base figure, which is a common shape incorporated into prescription lenses to help mitigate presbyopia. There can be more than two lenses as discussed in detail in the parent application. For example, there could be a pair of stationary lenses on the outside, each with half of one of the thickness functions, with the positionable lens with the complement in between. These special surfaces can be applied to any of the surfaces of the lenses. Manufacturing techniques that could be employed include: machining (such as with numerically controlled equipment), molding, casting, curing, and use of gradient index lenses for which thickness is replaced by "optical path length" defined by $(n-1)*(thickness)$ where n is the index of refraction. Putting a bow (such as spherical, cylindrical or ellipsoidal) on both surfaces of both lenses does not change the power of the lenses. The special surfaces providing complementary thicknesses would be in addition to these bows. In the preferred embodiments and in the claims, surface shapes are sometimes defined with mathematical equations. Minor modifications to the equations can be made without causing variations that could significantly adversely affect the performance of the lens systems. Therefore, in his claims Applicant has used the term "approximately" in connection with these equations with the intention of claiming systems that utilize surfaces that are defined by equations that are not exactly the same as the referenced equations but achieve the same result within the tolerance of the lens system as it is being applied. When applied to eyeglasses the applicable tolerance is the ability of the human eye to detect a difference.

The reader should understand that the present invention is not limited to the specific embodiments described above and that many modification and additions or deletions in addition to those described above could be made. Therefore, the scope of the invention should be determined by the appended claims and their legal equivalents.

What is claimed is:

1. A lens unit comprised of:
   A) a first lens having two surfaces providing a varying lens thickness as a function of position across the lens surfaces and
   B) a second lens having two surfaces providing a varying lens thickness as a function of position across the lens surfaces that is substantially complementary to the varying thickness of the first lens;
   wherein the designs of the thicknesses are chosen such that small adjustments of the relative positions of the two lenses in a first direction predominantly perpendicular to the viewing direction results in changes in the combined focus of the two lenses of each lens unit; and
   wherein the thicknesses are designed substantially in accordance with the following procedure:
   A) provide a lens thickness of the first lens to be $f\_lens1(X,Y)=C*(X^3/3+XY^2)+t_0+$(any polynomial of degree <3), where C and $t_0$ are constants,
   B) provide a lens thickness of the second lens to be $f\_lens2(X,Y)=-C*(X^3/3+XY^2)+t_0+$(the complementary polynomial),
   C) move the lenses with respect to each other in X and Y, to provide a net thickness of both lenses of: $f\_lens1(X+dx,Y+dy)+f\_lens2(X-dx,Y-dy)$ which evaluates to $[2*C*dx*(X^2+Y^2)]+[2*C*dy*(2XY)]+[(2/3)*C*dx*(dx^2+3dy^2)]+2t_0+$(a polynomial of degree <2);

wherein, the first bracketed term, proportional to dx, is the focus, the second bracketed term, proportional to dy, is astigmatism in a certain direction, and the third and fourth terms are just net thickness and wedge, which do not effect visual acuity.

2. The lens unit as in claim 1 wherein after shifting and rotation, the lenses are cut out to fit into spectacle frames.

3. The lens unit as in claim 2 wherein the lenses of the lens unit includes at least one additional feature chosen from the following group of features: an overall bow, or any polynomial degree less than 3, a deviation which is not noticeable to the eye, a tapered from the center, a base amount of constant correction which is not complementary, such as a base focus correction or a progressive lens correction.

4. The lens unit comprised of:
  A) a first lens having two surfaces providing a varying lens thickness as a function of position across the lens surfaces and
  B) a second lens having two surfaces providing a varying lens thickness as a function of position across the lens surfaces that is substantially complementary to the varying thickness of the first lens;
wherein the designs of the thicknesses are chosen such that small adjustments of the relative positions of the two lenses in a first direction predominantly perpendicular to the viewing direction results in changes in the combined focus of the two lenses of each lens unit; and
wherein astigmatism is corrected by a small adjustment in a second direction perpendicular to the first direction and a rotation of the two lenses about an axis of the two lenses; and wherein the thicknesses are designed substantially in accordance with the following procedure:
  A) provide a lens thickness of the first lens to be $f\_lens1(X,Y)=C*(X^3/3+XY^2)+t_0+$(any polynomial of degree <3), where C and $t_0$ are constants,
  B) provide a lens thickness of the second lens to be $f\_lens2(X,Y)=-C*(X^3/3+XY^2)+t_0+$(the complementary polynomial),
  C) move the lenses with respect to each other in X and Y, to provide a net thickness of both lenses of: $f\_lens1(X+dx,Y+dy)+f\_lens2(X-dx,Y-dy)$ which evaluates to $[2*C*dx*(X^2+Y^2)]+[2*C*dy*(2XY)]+[(2/3)*C*dx*(dx^2+3dy^2)]+2t_0+$(a polynomial of degree <2);
wherein, the first bracketed term, proportional to dx, is the focus, the second bracketed term, proportional to dy, is astigmatism in a certain direction, and the third bracketed term and fourth term are just net thickness and wedge, which do not effect visual acuity.

5. The lens unit as in claim 4 wherein the pair of lenses is rotated, as a unit, after an offset has been applied; wherein astigmatism comes in two directions, described by 2XY and $X^2-Y^2$, which directions are equivalent to each other except for a 45° rotation; and wherein rotation is applied in order to make the lens pair correct both directions of astigmatism.

6. The lens unit as in claim 5 wherein after shifting and rotation, the lenses are cut out to fit into spectacle frames.

7. The lens unit as in claim 6 wherein the lenses of the lens unit includes at least one additional feature chosen from the following group of features: an overall bow; any polynomial degree less than 3; a deviation which is not noticeable to the eye; a taper from the center; and a base amount of constant correction which is not complementary (such as a base focus correction; or a progressive lens correction).

* * * * *